(12) United States Patent
Bazzani et al.

(10) Patent No.: US 11,720,942 B1
(45) Date of Patent: Aug. 8, 2023

(54) INTERACTIVE RETRIEVAL USING VISUAL SEMANTIC MATCHING

(71) Applicant: Amazon Technologies, Inc., Seattle, WA (US)

(72) Inventors: Loris Bazzani, Berlin (DE); Yanbei Chen, London (GB)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 234 days.

(21) Appl. No.: 16/915,361

(22) Filed: Jun. 29, 2020

Related U.S. Application Data

(60) Provisional application No. 62/934,440, filed on Nov. 12, 2019.

(51) Int. Cl.
*G06Q 30/06* (2023.01)
*G06N 3/02* (2006.01)
*G06F 16/535* (2019.01)
*G06Q 30/0601* (2023.01)
*G06T 7/00* (2017.01)

(52) U.S. Cl.
CPC ....... *G06Q 30/0613* (2013.01); *G06F 16/535* (2019.01); *G06N 3/02* (2013.01); *G06T 7/00* (2013.01)

(58) Field of Classification Search
CPC ..... G06Q 30/0613; G06F 16/535; G06N 3/02; G06T 17/00
USPC ....................... 705/3-40; 382/159
See application file for complete search history.

(56) References Cited

U.S. PATENT DOCUMENTS 10,776,626 B1*  9/2020  Lin
10,949,907 B1*  3/2021  Jain et al.
2015/0078667 A1*  3/2015  Yun et al.
(Continued)

FOREIGN PATENT DOCUMENTS

WO  2019013711 A1*  1/2019

OTHER PUBLICATIONS

Ak et al.; Learning Attribute Representations with Localization for Flexible Fashion Search; Proceedings of the IEEE Conference on Computer Vision and Pattern Recognition; Jun. 2018; 10 pgs.
Chen et al.; Inferring Analogous Attributes; Proceedings of the IEEE Conference on Computer Vision and Pattern Recognition; 2014; 8 pgs.
Guo et al.; Dialog-based Interactive Image Retrieval; 32nd Conference on Neural Information Processing Systems; 2018; 11 pgs; Montreal, Canada.
(Continued)

*Primary Examiner* — Frantzy Poinvil
(74) *Attorney, Agent, or Firm* — K&L Gates LLP (57) ABSTRACT

Techniques are generally described for interactive image retrieval using visual semantic matching. Image data and text data are encoded into a single shared visual semantic embedding space. A prediction model is trained using reference inputs, target outputs, and modification text describing changes to the reference inputs to obtain the target outputs. The prediction model can be used to perform image-to-text, text-to-image, and interactive retrieval.

20 Claims, 8 Drawing Sheets

(56) References Cited

U.S. PATENT DOCUMENTS

2018/0107685 A1\* 4/2018 Kale et al.
2020/0042822 A1\* 2/2020 Chae
2021/0117948 A1\* 4/2021 Voss
2021/0133919 A1\* 5/2021 Ayush et al.

OTHER PUBLICATIONS

Junyu Lin et al., "PaintNet: A shape-constrained generative framework for generating clothing from fashion model:, Multimedia Tools and Applications, 80:17183-17203, Nov. (Year: 2019).\*
Kovashka et al.; WhittleSearch: Image Search with Relative Attribute Feedback; Proceedings of the IEEE Conference on Computer Vision and Pattern Recognition; 2012; 8 pgs.
Vo et al.; Composing Text and Image for Image Retrieval - An Empirical Odyssey; Cornell University; Dec. 18, 2012; 10 pgs.
Zhao et al.; Memory-Augmented Attribute Manipulation Networks for Interactive Fashion Search; Proceedings of the IEEE Conference on Computer Vision and Pattern Recognition; Jul. 2017; 9 pgs.

\* cited by examiner

INTERACTIVE RETRIEVAL USING VISUAL SEMANTIC MATCHING

CROSS REFERENCE TO RELATED APPLICATIONS

This application claims the benefit of U.S. Provisional Application No. 62/934,440, filed Nov. 12, 2019, the disclosure of which is incorporated herein by reference in its entirety.

BACKGROUND

Users often conduct computer-assisted searches of large image collections to locate an image that matches a query. Neural networks have been used to improve these search results, and, in some case, users are able to refine the initial query to obtain more accurate results. In image retrieval systems, users can use an initial image as an input to a neural network to retrieve additional images similar to the initial image. Despite considerable progress in recent years, there remains a need for improved retrieval systems.

DETAILED DESCRIPTION

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Text-based retrieval methods have been the foundation of many advances and developments in different domains, such as search engines, organization of documents, and, more recently, natural language processing-based technologies. In addition, content-based image retrieval approaches have demonstrated great success in various tasks in the past decade, such as image search, facial recognition and verification, and fashion product recommendation. In some cases, documents may contain multimodal material, including both images and text.

A user of a search engine may search for an item without being aware of all of the different permutations that may be available for the item. For example, a user may search an online retailer for blue pants. However, the use of the search string "blue sandals" may return a very large set of items. For example, the search may return shoes of different materials, styles, shades of blue, etc. Accordingly, the user may wish refine the search to obtain better results. However, the semantic complexity of fashion, color-matching complexity, and the large variety of fashion styles and/or product attributes may make it difficult for a user to select the search terms such that a desired item or set of items are returned.

Machine learning is a field of artificial intelligence that allows computer-implemented systems to perform a task without the use of task-specific code. Machine learning systems may be trained to progressively improve performance of a task using sets of training data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data.

In various examples, machine learning systems are described that enable users to search a database containing both images and text. The system may enable interactive retrieval to allow the user to follow up an initial query result with additional query terms to refine the search results. In a fashion search application, the image data may allow the user to visualize items of clothing that are representative of the user's initial query, thereby allowing the user to see a visual depiction of items/objects resulting from that query. The user may then modify the search query by adding modification text in the form of natural language or attribute descriptions, so as to retrieve improved search results based on the user's descriptions of desired similarities or differences from the initial query result.

Various machine learning models described herein may be used to provide search results based on a user's descriptions with respect to an initial reference point. For simplicity, examples are provided in which images of articles of clothing are depicted. However, it should be appreciated that the techniques described herein may be agnostic to any particular type and/or class of objects and may be generally applicable to any object and/or visible features.

Figure 1:
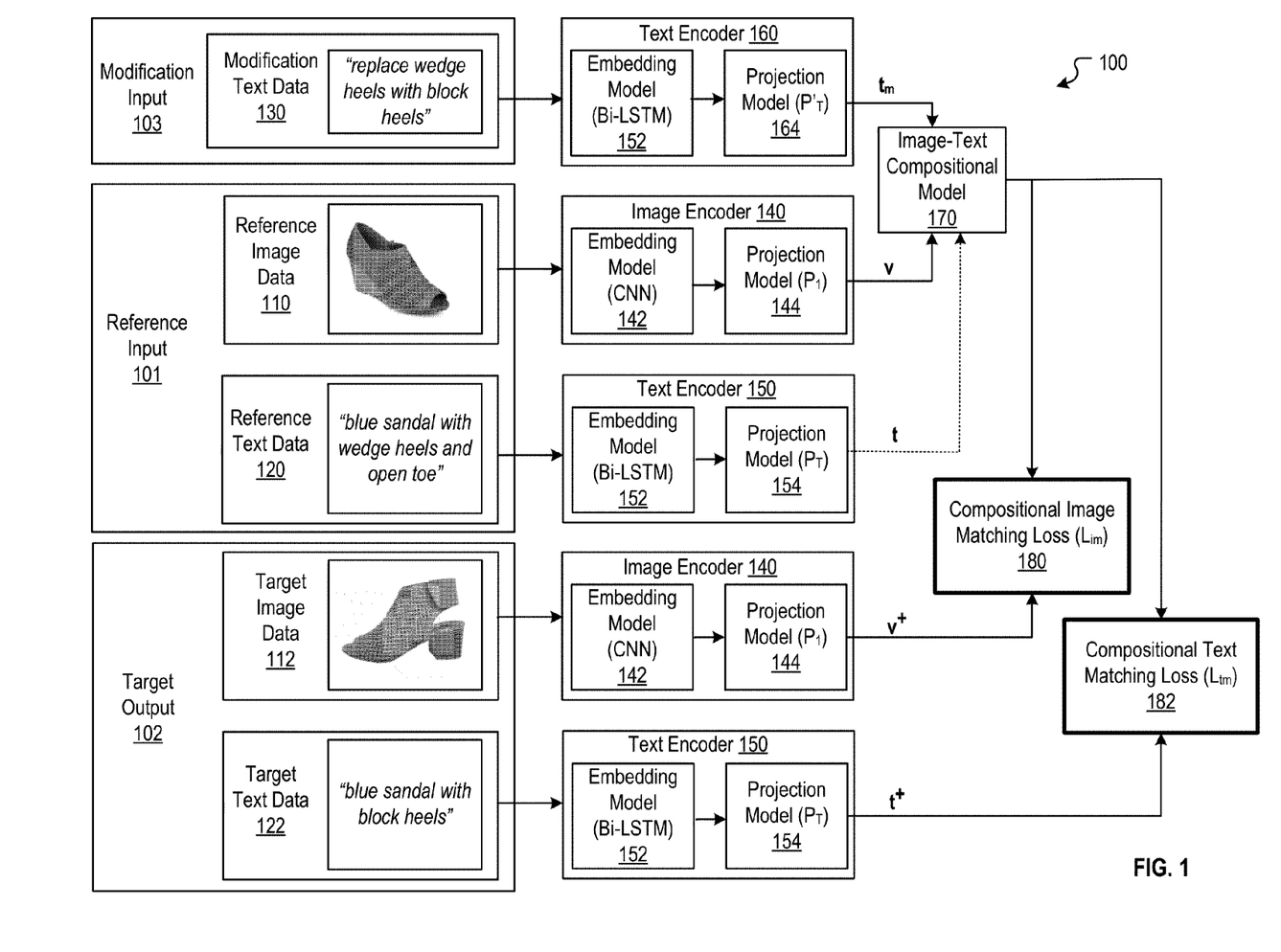
FIG. 1 is a block diagram illustrating a training process for a prediction model, in accordance with various aspects of the present disclosure.

FIG. 1 is a block diagram illustrating a training process 100 for a prediction model, in accordance with embodiments of the present invention. The illustrated model and various example described herein relate to a prediction model that can enable interactive retrieval of objects (e.g., images or products) by refining search results in response to descriptive feedback from the user. This can provide an improved interactive online shopping experience that helps users search or discover products.

The training process utilizes an annotated training data set that includes a plurality of sets of training data, with each set including a reference input 101, a modification input 103, and one or more target outputs 102. The reference input 101 could be, e.g., reference image data 110, reference text data 120, or both. The reference image data 110 may represent, e.g., an image of an article of clothing, such as a shoe, and the reference text data 120 may be, e.g., a textual description of that article of clothing. The modification input 103 comprises, e.g., modification text data 130 that describes modifications or changes to be combined with the reference input 101 to generate a predicted result. The target output 102 comprises a target image data output 112 or target text data output 122 that represents a known result of the modification of the reference input. The image encoder 140 and text encoder 150 are used to encode image data and text data into a single shared visual semantic embedding space that aligns image and text representations, as will be described in greater detail below with respect to FIG. 2.

Figure 2:
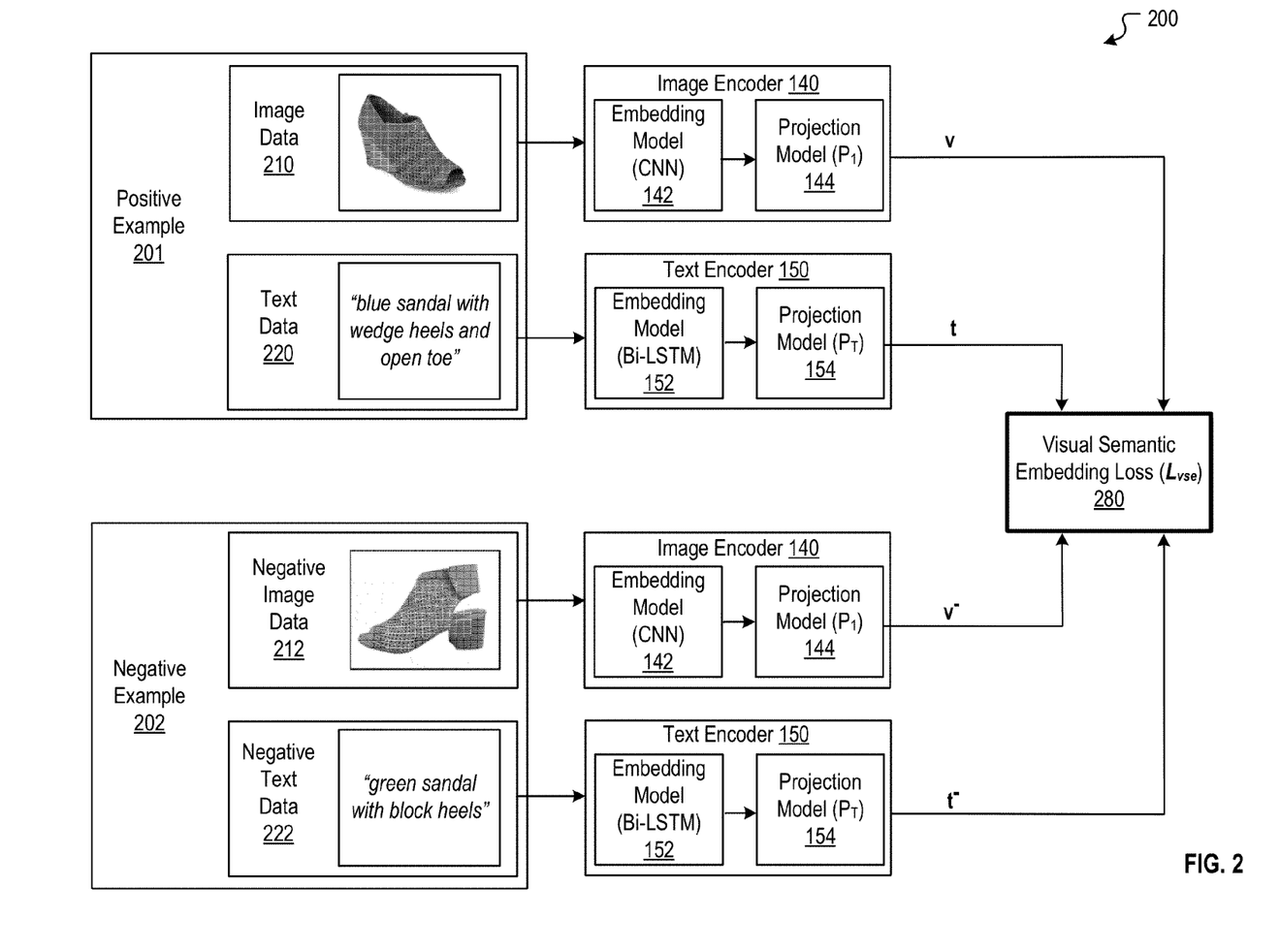
FIG. 2 is a block diagram illustrating the generation of a visual semantic embedding space, in accordance with various aspects of the present disclosure.

FIG. 2 is a block diagram 200 illustrating the generation of a visual semantic embedding (VSE) model, in accordance with various aspects of the present disclosure. In this example, an annotated data set containing image data and related text descriptions of the image represented by the image data is utilized. In FIG. 2, image data 210 represents an image of a blue sandal and text data 220 contains a text description of the blue sandal, e.g., "blue sandal with wedge heels and open toe" are selected for training. The image data 210 is encoded by the image encoder 140 to produce a positive reference image vector, v, and the text data 220 is encoded by text encoder 150 to produce a positive reference text vector, t.

The objective is to build an embedding space in which images and text are semantically tied in a shared embedding space. Accordingly, in this visual semantic embedding space, image and text vectors that are close to each other represent images and text that are similar to each other. Because the image data 210 and text data 220 visually and semantically align with each other, the vectors v and t corresponding to the encoded image data 210 and text data 220 will be close to each other in the embedding space. In the illustrated example, the image encoder 140 for encoding image data first utilizes a visual embedding model, which projects the image data 210 into a visual representation. The visual embedding model could be, e.g., a pretrained convolutional neural network (CNN) classifier 142. In the illustrated example, a MobileNet computer vision model with the classification layer removed is used as the backbone network for its quality speed tradeoff. The text encoder 150 for encoding text data utilizes a textual embedding model, which projects the text data 220 into a textual representation. The textual embedding model could be, e.g., a single layer bi-directional long short term memory (Bi-LSTM) neural network 152.

Next, semantic projection layers are used to project the visual and textual representations into the common joint visual semantic embedding space, where both images and text can be compared. In FIG. 2, image projection model ($P_1$) 144 and text projection model ($P_T$) 154 produce linear mappings of the outputs of the CNN 142 and Bi-LSTM 152. The vectors v and t are the feature representations of the visual embedding model 142 and text embedding model 152 after the projection models $P_1$ and $P_T$. In one embodiment, the projections $P_1$ and $P_T$ are linear layers with 512 units, which is the dimensionality of the shared visual semantic embedding space.

Vectors representing images or data that differ semantically from the positive example 201 should be relatively far from the positive vectors v and t. In training, a negative example 202 that differs from the positive example 201 is selected. The negative example 202 includes negative image data 212 representing an image of a different sandal than the one represented by image data 210, and negative text data 222 containing a description of the sandal represented in the negative image data 212. The negative image data 212 and negative text data 222 are encoded by encoders 140, 150, respectively, to produce negative image vector v- and negative text vector t-.

The visual semantic embedding model is trained by optimizing for the bidirectional triplet ranking loss, or visual semantic embedding loss ($L_{vse}$) 280, which is calculated as follows:

$$L_{vse} = \left[ d(v,t) - d(v,t^-) + m \right]_+ + \left[ d(v,t) - d(v^-,t) + m \right]_+$$

Figure 3:
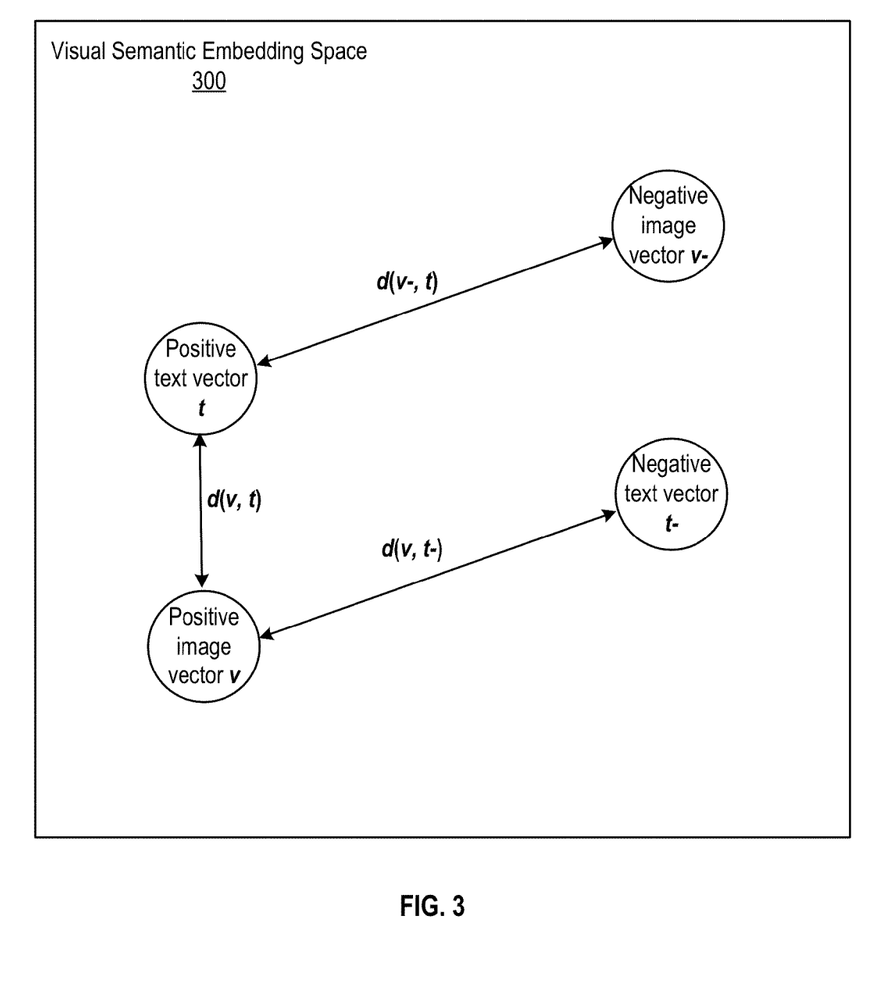
FIG. 3 is a simplified illustration of a visual semantic embedding loss in a visual semantic embedding space, in accordance with various aspects of the present disclosure.

FIG. 3 is a simplified illustration of the calculation of the visual semantic embedding loss in the visual semantic embedding space 300, in accordance with various aspects of the present disclosure. FIG. 3 shows the locations of the positive vectors v and t and negative vectors v- and t-, where d(•,•) denotes the L2 normalization distance between the two vectors, [•]+ denotes max(0, •), and m is the margin between positive and negative pairs. The value for the margin m may be selected based on empirical testing. It may be desired that, during testing, a selected margin m results in a list of the top five or top ten predicted outputs that includes the known target output.

The negative sample vectors v- and vector t-. can be selected using a mini-batch semi-hard mining with the conditions d(v, t) < d(v, t-) for t-, and d(v, t) < d(v-, t) for v-, which select the semi-hard negative samples to provide more stable and faster convergence.

The shared visual semantic embedding space can then be trained using the visual semantic embedding losses $L_{vse}$.

It should be noted that in the embodiment described above, $L_{vse}$ is calculated based on the distances between the positive text vector t and the negative image vector v-, and between the positive image vector v and the negative text vector t-. In other embodiments, the distances between the positive text vector t and the negative text vector t-, and between the positive image vector v and the negative image vector v-.

Image-Text Compositional Embedding

After the pre-training the visual semantic embedding model with the visual semantic embedding loss $L_{vse}$ is completed, an image-text compositional model 170 can be trained to learn encodings of reference inputs and modification inputs to retrieve predicted outputs. These predicted outputs should represent the result of the changes specified by the modification input applied to the reference input.

Returning to the training process 100 shown in FIG. 1, the reference image data 110 is encoded by image encoder 140 to produce positive reference image vector v, and the target image data 112 is encoded by image encoder 140 to produce positive target image vector v+, as described above with reference to FIG. 3. The modification text data 130 is encoded by encoder 160 to produce vector $t_m$. The encoder 160 may use the same Bi-LSTM textual embedding model 152 used in text encoder 150, but with a different projection model ($P_T'$) 164, which is initialized with $P_T$ pretrained using the visual semantic embedding loss $L_{vse}$. The projection layer $P_T'$ different than projection layer $P_T$ is used because the function of the modification text data 130 is to modify the image, whereas the function of the reference text data 120 and the reference text data 120 is to describe the image. In some embodiments, the training examples contain auxiliary privileged information in the form of attribute-like descriptions which are encoded into t via the textual embedding model 152 and its semantic projection model $P_T$ 154.

In the embodiment illustrated in FIG. 1, the modification input comprises modification text data 130. In other embodiments, the modification input may take other forms, such as, e.g., an image or a region of the reference image selected by the user. In this case, a suitable encoder, such as an image encoder similar to image encoder 140, may be used to produce the vector $t_m$. The user may upload a new image or identify a region of the reference image to indicate a feature or aspect that the user likes or dislikes, in which case, the predicted output would reflect a modification that emphasizes or avoids that feature or aspect.

A variety of techniques may be used to combine the features of the encoded reference image data v with the encoded modification text data $t_m$ to produce a predicted output vector, which corresponds to a new semantic representation that resembles the visual representation of the target image. In some embodiments, the image-text compositional model 170 determines a weighted sum of the encoded reference image data v and the encoded modification text data $t_m$ to produce the predicted output vector.

In other embodiments, a gated residual connection may be used to combine the encoded reference image data v with the encoded modification text data $t_m$. The combination of text and image inputs using gated residual connections may be performed as follows:

$$f_c(x,t) = w_g f_{gate}(\phi_x, \phi_t) + w_r f_{res}(\phi_x, \phi_t)$$

where:

$$f_{gate}, f_{res} \in \mathbb{R}^{W+H+C}$$

are gating and residual features used for the composition, and $W_g$ and $W_r$ are learnable weights to balance them.

The gating connection is computed by:

$$f_{gate}(\phi_x, \phi_t) = \sigma\big(W_{g2} * \mathrm{RELU}(W_{g1} * [\phi_x, \phi_t])\big) \odot \phi_x$$

where σ is the sigmoid function, ⊙ is element wise product, * represents 2D convolution with batch normalization, and $W_{g1}$ and $W_{g2}$ are 3×3 convolution filters.

The residual connection is computed by:

$$f_{res}(\phi_x, \phi_t) = W_{r2} * \mathrm{RELU}(W_{r1} * ([\phi_x, \phi_t]))$$

The modification may be applied to the output $\phi_x$ of the image projection model ($P_1$) 144 and the output $\phi_t$ of the projection model ($P_1$) 164.

An advantage of this approach is that it can leverage gated residual connections to modify the image feature based on the text feature, while retaining the original image feature in the case that the modification text is not important. The predicted output vector, referred to as the compositional embedding c, is defined as $C = f_c(v, t_m)$, where TIRG $f_c(.,.)$ on the encoded reference image data v and the encoded modification text data $t_m$. It is to be understood that other approaches may be used in order to generate a predicted output vector that takes into consideration the classification text.

Figure 4:
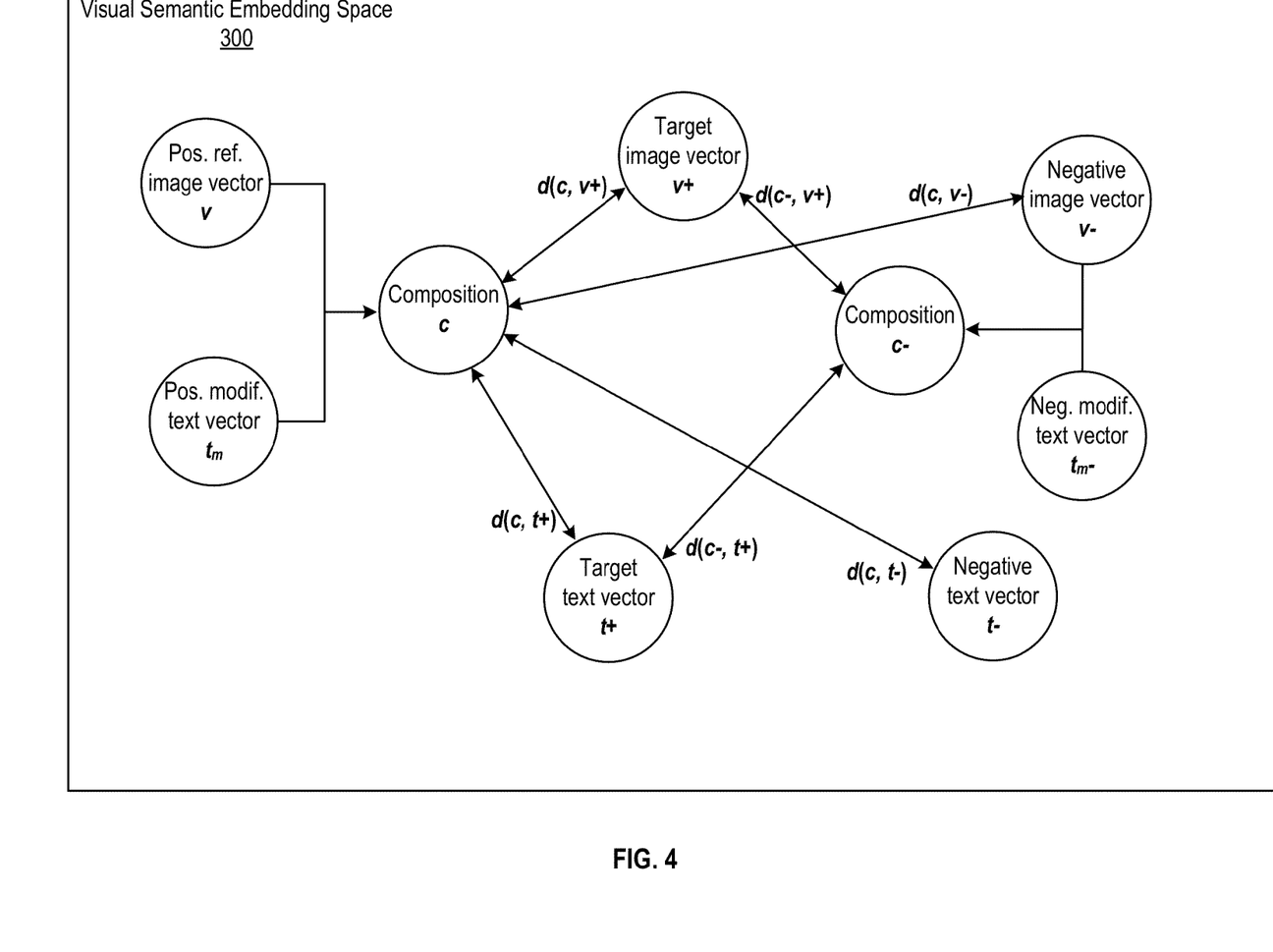
FIG. 4 is a simplified illustration of a compositional image matching loss and a compositional text matching loss in a visual semantic embedding space, in accordance with various aspects of the present disclosure.

The prediction model may be trained using $L_{vse}$ and two additional loss functions defined in the compositional embedding space: the compositional image matching loss $L_{im}$ and the compositional text matching loss $L_{tm}$. FIG. 4 is a simplified illustration of the calculation of the compositional image matching loss $L_{im}$ and the compositional text matching loss $L_{tm}$ in the visual semantic embedding space 300, in accordance with various aspects of the present disclosure.

The compositional image matching loss $L_{im}$ as a bidirectional triplet ranking loss as follows:

$$L_{im} = \big[d(c, v^+) - d(c^-, v^+) + m\big]_+ + \big[d(c, v^+) - d(c, v^-) + m\big]_+$$

where c- is the composition of encoded negative image data v- and its corresponding encoded negative modification text data $t_m$-. The negative image data and negative modification text can be selected using a semi-hard mining process. $L_{im}$ is used to encourage alignment between the compositional embedding and the target image while pushing away other negative compositional and image embeddings.

The compositional text matching loss has access to the privileged information and is defined as follows:

$$L_{tm} = \big[d(c, t^+) - d(c^-, t^+) + m\big]_+ + \big[d(c, t^+) - d(c, t^-) + m\big]_+$$

where $L_{tm}$ is used to encourage alignment between the compositional embedding and the target text while pushing away other negative compositional and text embeddings.

A final loss function is defined as a composition of the visual semantic embedding loss $L_{vse}$ and the compositional losses described above:

$$L = L_{vse} + L_{im} + L_{tm}$$

The prediction model can then be trained using these loss functions.

Figure 5:
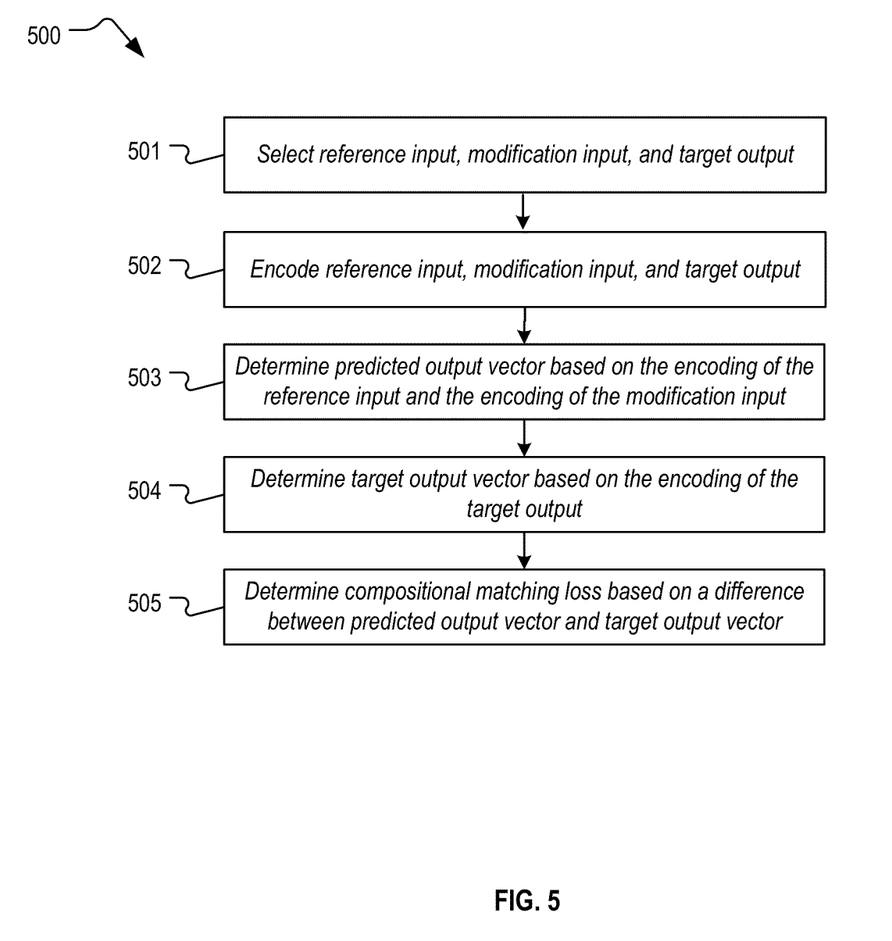
FIG. 5 depicts a process 500 for training a visual semantic prediction model, in accordance with various aspects of the present disclosure.

FIG. 5 depicts a process 500 for training a visual semantic prediction model, in accordance with embodiments of the present invention. In step 501, a reference input, modification input, and target output are selected from an annotated training data set. In step 502, the reference input, modification input, and target output are encoded into a single visual semantic embedding space. In step 503, a predicted output vector is determined based at least in part on the encoding of the reference input and the encoding of the modification input. In step 504, a target output vector is determined based at least in part on the encoding of the target output. In step 505, a compositional matching loss is determined based at least in part on a difference between the predicted output vector and target output vector.

After the prediction model is trained, it can then be used to generate predicted outputs based on reference image data and modification text data provided by users during run-time operation of the system.

Figure 6:
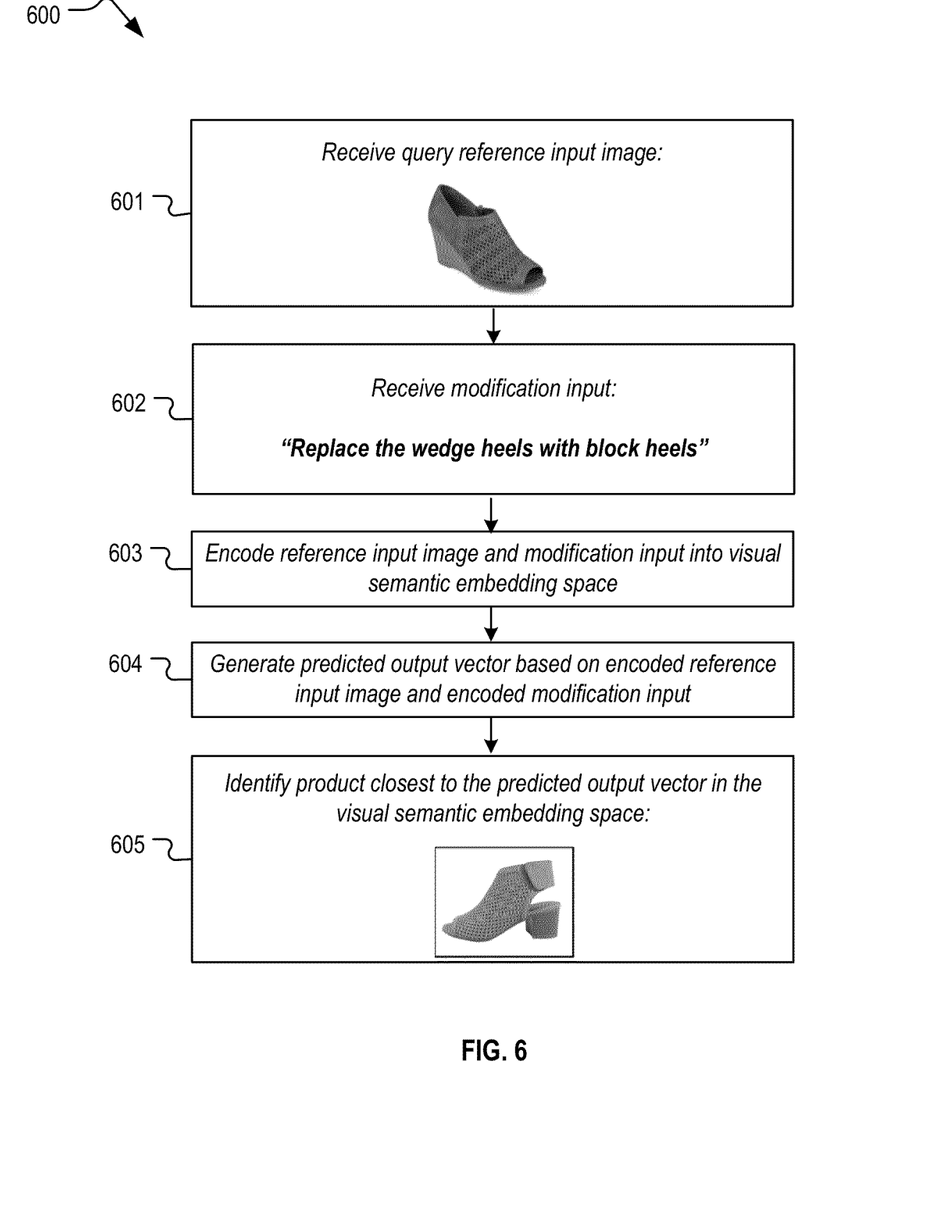
FIG. 6 depicts a process for retrieving an output image based on an input image and a modification input, in accordance with embodiments of the present invention.

FIG. 6 depicts a run-time process 600 for retrieving an output image based on an input image and a modification input, in accordance with embodiments of the present invention. The illustrated embodiment depicts an image retrieval process used in the context of an online shopping experience. In step 601, a query reference input image is received from a user. In the illustrated example, the query reference input image is of a blue sandal, which may have been selected in a variety of ways. For example, the user may have selected the image of the blue sandal from a set of images provided in response to an initial search query. Alternatively, the user may upload the image of the blue sandal from the user's local computing device to use as the reference input image.

In step 602, a modification input is received. In the illustrated example, the user may enter a natural language description of changes the user wishes to make on the reference input image, e.g., "Replace the wedge heels with block heels."

In step 603, the reference input image and the modification input are encoded into the visual semantic embedding space trained as described above. For run-time operation, a catalog of products available in the online store are encoded into the visual semantic embedding space.

In step 604, a predicted output vector is generated based at least in part on the encoded reference input image and the encoded modification input.

In step 605, the product closest to the predicted output vector in the visual semantic embedding space is identified and returned to the user. In some embodiments, a set of the objects closest to the predicted output vector are selected and returned to the user. In the case of an online shopping service, each of the products in the catalog of available products for presentation to the user is encoded using the image encoder 140 and/or text encoder 150 to generate a collection of product vectors in the visual semantic embedding space. In this shopping example, after the predicted output vector is determined, a set of the product vectors closest to the predicted output vector (e.g., the top five or top ten closest product vectors) are identified and presented to the user for consideration. The user may then review the images of the top candidates predicted to meet the user's intended modification.

Embodiments of the present invention may provide various advantages not provided by prior art systems. For example, many existing image retrieval models are optimized for either an image-to-image retrieval task or a text-to-image retrieval task. However, images are often associated with multimodal information, e.g., an image and a corresponding textual description of the image, but these existing image retrieval models are limited because they fail to utilize this multimodal information effectively. Some more recent image retrieval models incorporate both the images and corresponding text in a shared common space. Embodiments of the present invention further incorporate modification descriptions, which describe desired changes to a reference image to produce a target output. By encoding images, textual descriptions of those images, and modification descriptions in a shared common space, these embodiments can provide an improved retrieval experience by enabling performance of image-to-text, text-to-image, and interactive retrieval with a single model. This unified model can learn both a visual semantic embedding space and compositional functions, thereby enabling the composition of images and modification text. Embodiments may also enable the use of textual information in different forms of composition, such as modification descriptions describing attributes to be modified (e.g., "replace wedge heels with block heels") and natural language modification descriptions including abstract concepts (e.g., "has a floral pattern and is shorter").

While the invention has been described in terms of particular embodiments and illustrative figures, those of ordinary skill in the art will recognize that the invention is not limited to the embodiments or figures described. Many of the embodiments described above are directed to retrieval of images of articles of clothing. These embodiments can be particularly advantageous for fashion and clothing sales applications. However, other embodiments in other applications, such as, furniture, image search, or any other application involving the search of visual images.

Figure 7:
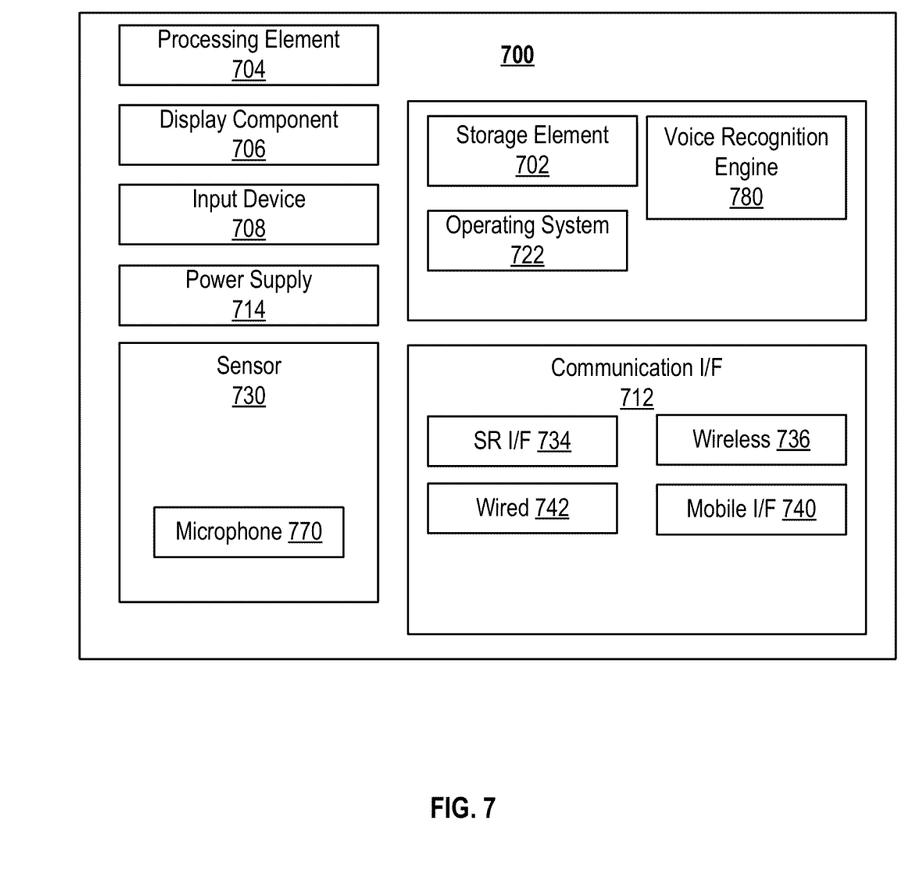
FIG. 7 is a block diagram showing an example architecture of a computing device, in accordance with various aspects of the present disclosure.

FIG. 7 is a block diagram showing an example architecture 700 of a computing device, such as the computing devices used by users to search for images or the computing devices used to train and operate the prediction model. It will be appreciated that not all computing devices will include all of the components of the architecture 700 and some computing devices may include additional components not shown in the architecture 700. The architecture 700 may include one or more processing elements 704 for executing instructions and retrieving data stored in a non-transitory, computer-readable storage element 702. The processing element 704 may comprise at least one processor. Any suitable processor or processors may be used. For example, the processing element 704 may comprise one or more digital signal processors (DSPs) and/or image signal processors (ISPs). In some examples, the processing element 704 may be effective to perform one or more functions of models and processingdescribed above. The storage element 702 can include one or more different types of non-transitory, computer-readable memory, data storage, or computer-readable storage media devoted to different purposes within the architecture 700. For example, the storage element 702 may comprise flash memory, random-access memory, disk-based storage, etc. Different portions of the storage element 702, for example, may be used for program instructions for execution by the processing element 704, storage of images or other digital works, and/or a removable storage for transferring data to other devices, etc.

The storage element 702 may also store software for execution by the processing element 704. An operating system 722 may provide the user with an interface for operating the computing device and may facilitate communications and commands between applications executing on the architecture 700 and various hardware thereof.

When implemented in some computing devices, the architecture 700 may also comprise a display component 706. The display component 706 may comprise one or more light-emitting diodes (LEDs) or other suitable display technologies. Also, in some examples, the display component 706 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 700 may also include one or more input devices 708 operable to receive inputs from a user. The input devices 708 can include, for example, a push button, touch pad, touch screen, wheel, joystick, keyboard, mouse, trackball, keypad, light gun, game controller, or any other such device or element whereby a user can provide inputs to the architecture 700. These input devices 708 may be incorporated into the architecture 700 or operably coupled to the architecture 700 via wired or wireless interface. In some examples, architecture 700 may include a microphone 770 for capturing sounds, such as voice commands. Voice recognition engine 780 may interpret audio signals of sound captured by microphone 770. In some examples, voice recognition engine 780 may listen for a "wake word" to be received by microphone 770. Upon receipt of the wake word, voice recognition engine 780 may stream audio to a voice recognition server for analysis. In various examples, voice recognition engine 780 may stream audio to external computing devices via communication interface 712.

When the display component 706 includes a touch-sensitive display, the input devices 708 can include a touch sensor that operates in conjunction with the display component 706 to permit users to interact with the image displayed by the display component 706 using touch inputs (e.g., with a finger or stylus). The architecture 700 may also include a power supply 714, such as a wired alternating current (AC) converter, a rechargeable battery operable to be recharged through conventional plug-in approaches, or through other approaches such as capacitive or inductive charging.

The communication interface 712 may comprise one or more wired or wireless components operable to communicate with one or more other computing devices. For example, the communication interface 712 may comprise a wireless communication module 736 configured to communicate on a network, such as the network 104, according to any suitable wireless protocol, such as IEEE 802.11 or another suitable wireless local area network (WLAN) protocol. A short range interface 734 may be configured to communicate using one or more short range wireless protocols such as, for example, near field communications (NFC), Bluetooth, Bluetooth LE, etc. A mobile interface 740 may be configured to communicate utilizing a cellular or other mobile protocol. A wired communication module 742 may be configured to communicate according to the USB protocol or any other suitable protocol. In various examples, mobile interface 740 may allow computing device(s) 107 to communicate with one or more other computing devices that may be used to perform various aspects of the techniques described herein.

The architecture 700 may also include one or more sensors 730 such as, for example, one or more position sensors, image sensors, and/or motion sensors.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

An example system for interactive retrieval using visual semantic matching will now be described in detail. In particular, FIG. 7 illustrates an example computing environment in which the embodiments described herein may be implemented. FIG. 7 is a diagram schematically illustrating an example of a data center 85 that can provide computing resources to users 80*a* and 80*b* (which may be referred herein singularly as user 80 or in the plural as users 80) via user computers 82*a* and 82*b* (which may be referred herein singularly as user computer 82 or in the plural as user computers 82) via network 104. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 86*a* and 86*b* (which may be referred herein singularly as server 86 or in the plural as servers 86) that provide computing resources. These resources may be available as bare metal resources or as virtual machine instances 88*a-d* (which may be referred herein singularly as virtual machine instance 88 or in the plural as virtual machine instances 88). In at least some examples, server manager 87 may control operation of and/or maintain servers 86. Virtual machine instances 88*c* and 88*d* are rendition switching virtual machine ("RSVM") instances. The RSVM virtual machine instances 88*c* and 88*d* may be configured to perform all, or any portion, of the described above. As should be appreciated, while the particular example illustrated in FIG. 7 includes one RSVM virtual machine in each server, this is merely an example. A server may include more than one RSVM virtual machine or may not include any RSVM virtual machines. In the example of virtual machine instances, each of the servers 86 may be configured to execute an instance manager 83*a* or 83*b* (which may be referred herein singularly as instance manager 83 or in the plural as instance managers 83) capable of executing the virtual machine instances 88. The instance managers 83 may be a virtual machine monitor (VMM) or another type of program configured to enable the execution of virtual machine instances 88 on server 86, for example. As discussed above, each of the virtual machine instances 88 may be configured to execute all or a portion of an application.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Figure 8:
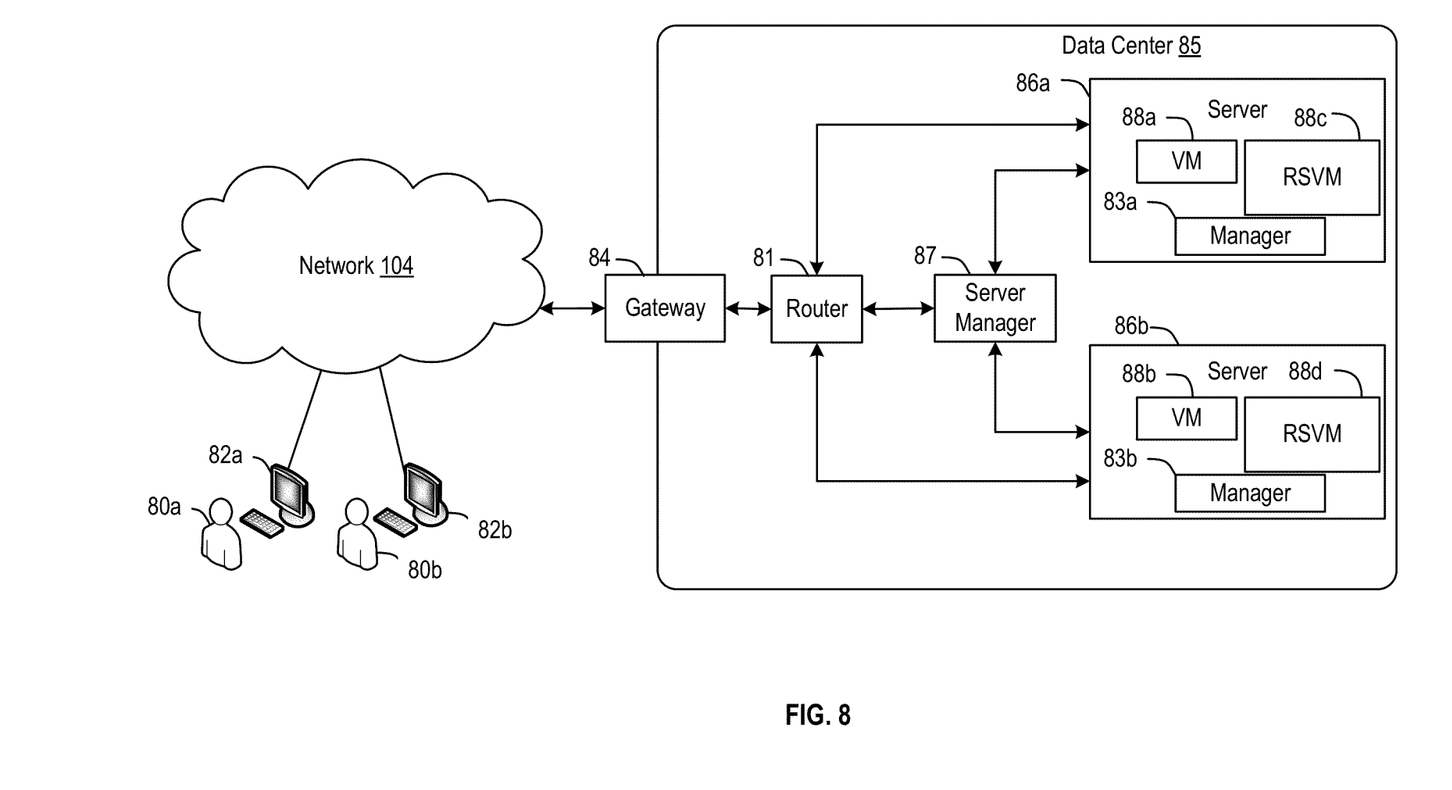
FIG. 8 is a diagram illustrating an example computing environment that may be used in accordance with the present disclosure.

Referring to FIG. 8, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 82. User computers 82 may be computers utilized by users 80 or other customers of data center 85. For instance, user computer 82a or 82b may be a server, a desktop or laptop personal computer, a tablet computer, a wireless telephone, a personal digital assistant (PDA), an e-book reader, a game console, a set-top box or any other computing device capable of accessing data center 85. User computer 82a or 82b may connect directly to the Internet (e.g., via a cable modem or a Digital Subscriber Line (DSL)). Although only two user computers 82a and 82b are depicted, it should be appreciated that there may be multiple user computers.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 81 may be utilized to interconnect the servers 86a and 86b. Router 81 may also be connected to gateway 84, which is connected to network 104. Router 81 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a data center 85 is also employed to at least in part direct various communications to, from and/or between servers 86a and 86b. While FIG. 7 depicts router 81 positioned between gateway 84 and data center 85, this is merely an exemplary configuration. In some cases, for example, data center 85 may be positioned between gateway 84 and router 81. Data center 85 may, in some cases, examine portions of incoming communications from user computers 82 to determine one or more appropriate servers 86 to receive and/or process the incoming communications. Data center 85 may determine appropriate servers to receive and/or process the incoming communications based on factors such as an identity, location or other attributes associated with user computers 82, a nature of a task with which the communications are associated, a priority of a task with which the communications are associated, a duration of a task with which the communications are associated, a size and/or estimated resource usage of a task with which the communications are associated and many other factors. Data center 85 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory, computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of interactive shopping assistance, said method comprising:
    training a machine learning product prediction model based at least in part on:
        determining, using at least one processor, a predicted output vector based on an encoding of a reference image input and an encoding of a modification text input describing a modification to the reference image input that results in a target image output;
        determining, using the at least one processor, a target output vector based at least in part on an encoding of the target image output; and
        determining, using the at least one processor, a compositional matching loss based at least in part on a difference between the predicted output vector and the target output vector;
    receiving image data from a user, the image data representing an image of an article of clothing;
    receiving a modification input from the user, the modification input describing a desired modification to the article of clothing; and
    processing the image data and the modification input with the machine learning product prediction model to identify a target product corresponding to the desired modification to the article of clothing; and
    sending image data of the target product to the user.

2. The method according to claim 1, further comprising:
    training an embedding model based at least in part on:
        determining a first representation of reference image data;
        determining a second representation of a reference textual description describing the reference image data;
        determining a third representation of negative reference image data different than the reference image data;
        determining a fourth representation of a negative reference description describing the negative reference image data; and
        determining an embedding loss based at least in part on the first representation, the second representation, the third representation, and the fourth representation; and
    generating the encoding of the reference image input using the embedding model; and
    generating the encoding of the target image output using the embedding model.

3. The method according to claim 1, further comprising:
    for each product of a plurality of products in product catalog, determining a corresponding product vector in an embedding space based at least in part on an encoding of a corresponding image of the product;

processing the image data and the modification input with the machine learning product prediction model to generate a predicted output vector in the embedding space, the predicted output vector corresponding to the desired modification to the article of clothing; and identifying the target product of the plurality of products by determining that a first product vector corresponding to the target product is closest of all of the product vectors to the predicted output vector in the embedding space.

4. A method, comprising:

training a machine learning prediction model based at least in part on:
- determining, using at least one processor, a predicted output vector based at least in part on an encoding of a reference input and an encoding of a modification input describing a modification to the reference input;
- determining, using the at least one processor, a target output vector based at least in part on an encoding of a target output; and
- determining, using the at least one processor, a compositional matching loss based at least in part on a difference between the predicted output vector and the target output vector;

receiving a query modification input describing a modification to a query reference input; and processing the query modification input and the query reference input with the machine learning prediction model to generate a predicted query output vector.

5. The method according to claim 4, further comprising:

for each of a plurality of objects in a database, determining a corresponding result vector based at least in part on an encoding of the object; and identifying a first object of the plurality of objects by determining that a first result vector corresponding to the first object is closest of all of the result vectors corresponding to the plurality of objects in the database to the predicted query output vector in an embedding space.

6. The method according to claim 4, wherein the training the machine learning prediction model comprises:
- determining the predicted output vector based at least in part on an encoding of a reference image data input and an encoding of a modification text input describing the modification to the reference image data input; and
- determining the target output vector based at least in part on an encoding of a target image data output.

7. The method according to claim 6, further comprising:

generating the encoding of the reference image data input by sending the reference image data input to a convolutional neural network (CNN) and applying an image projection model; and generating the encoding of the target image data output by sending the target image data output to a CNN and applying the image projection model.

8. The method according to claim 6, further comprising:

generating the encoding of the modification text input by sending the modification text input to a long short term memory (LSTM) and applying a text projection model.

9. The method according to claim 4, further comprising:

determining the compositional matching loss according to:

$$L = L_{vse} + L_{im} + L_{tm}$$

wherein L represents the compositional matching loss, $L_{vse}$ represents an embedding loss, $L_{im}$ represents a compositional image matching loss, and $L_{tm}$ represents a compositional text matching loss.

10. The method according to claim 4, further comprising:

training an embedding model based at least in part on:
- determining a first representation of reference image data;
- determining a second representation of a reference description describing the reference image data;
- determining a third representation of negative reference image data different than the reference image data;
- determining a fourth representation of a negative reference description describing the negative reference image data; and
- determining an embedding loss based at least in part on the first representation, the second representation, the third representation, and the fourth representation; and generating the encoding of the reference input using the embedding model; and generating the encoding of the target output using the embedding model.

11. The method according to claim 10, further comprising:

determining the embedding loss based at least in part on a first difference between the first representation and the fourth representation, and a second difference between the second representation and the third representation.

12. The method according to claim 10, further comprising:

determining the embedding loss according to:

$$L_{vse} = \left[d(v,t) - d(v,t^-) + m\right]_+ + \left[d(v,t) - d(v^-,t) + m\right]_+$$

wherein $L_{vse}$ represents the embedding loss, v represents the first representation of the reference image data, t represents the second representation of the reference description, v- represents the third representation of the negative reference image data, and t- represents the fourth representation of the negative reference description, d represents a distance between representations in an embedding space defined by the embedding model, and m represents a margin.

13. The method according to claim 4, wherein the training the machine learning prediction model further comprises:

determining a compositional image matching loss based at least in part on a difference between the predicted output vector and the target output vector representing a target image.

14. The method according to claim 4, wherein the training the machine learning prediction model further comprises:

determining a compositional text matching loss based at least in part on a difference between the predicted output vector and the target output vector representing a target text description.

15. A system, comprising:

at least one processor; and at least one non-transitory computer-readable memory storing instructions that, when executed by the at least one processor, are effective to program the processor to perform a method comprising:
- training a prediction model based at least in part on:
  - determining a predicted output vector based at least in part on an encoding of a reference input and an encoding of a modification input describing a modification to the reference input;
  - determining a target output vector based at least in part on an encoding of a target output; and determining a compositional matching loss based at least in part on a difference between the predicted output vector and the target output vector;

receiving a query modification input describing a modification to a query reference input; and processing the query modification input and the query reference input with the prediction model to generate a predicted query output vector.

16. The system of claim 15, the at least one non-transitory computer-readable memory storing further instructions that, when executed by the at least one processor, are further effective to program the at least one processor to perform the method further comprising:

for each of a plurality of objects in a database, determining a corresponding result vector based at least in part on an encoding of the object; and identifying a first object of the plurality of objects by determining that a first result vector corresponding to the first object is closest of all of the result vectors corresponding to the plurality of objects in the database to the predicted query output vector in an embedding space.

17. The system of claim 15, the at least one non-transitory computer-readable memory storing further instructions that, when executed by the at least one processor, are further effective to program the at least one processor to perform the method further comprising:

determining the predicted output vector based at least in part on an encoding of a reference image data input and an encoding of a modification text input describing the modification to the reference image data input; and determining the target output vector based at least in part on an encoding of a target image data output.

18. The system of claim 17, the at least one non-transitory computer-readable memory storing further instructions that, when executed by the at least one processor, are further effective to program the at least one processor to perform the method further comprising:

generating the encoding of the reference image data input by sending the reference image data input to a convolutional neural network (CNN) and applying an image projection model; and generating the encoding of the target image data output by sending the target image data output to a CNN and applying the image projection model.

19. The system of claim 17, the at least one non-transitory computer-readable memory storing further instructions that, when executed by the at least one processor, are further effective to program the at least one processor to perform the method further comprising:

generating the encoding of the modification text input by sending the modification text input to a long short term memory (LSTM) and applying a text projection model.

20. The system of claim 15, the at least one non-transitory computer-readable memory storing further instructions that, when executed by the at least one processor, are further effective to program the at least one processor to perform the method further comprising:

determining the compositional matching loss according to:

$$L = L_{vse} + L_{im} + L_{tm}$$

wherein L represents the compositional matching loss, $L_{vse}$ represents an embedding loss, $L_{im}$ represents a compositional image matching loss, and $L_{tm}$ represents a compositional text matching loss.

* * * * *